United States Patent
Lee et al.

(10) Patent No.: US 8,456,520 B2
(45) Date of Patent: Jun. 4, 2013

(54) METHOD FOR DISPLAYING A THREE-DIMENSIONAL IMAGE AND DISPLAY APPARATUS FOR PERFORMING THE METHOD

(75) Inventors: Hyo-Chul Lee, Uijeongbu-si (KR); Choong-Yull Kwak, Seoul (KR); Kyu-Hun Lim, Buyeo-gun (KR); Hyang-A Park, Incheon (KR)

(73) Assignee: Samsung Display Co., Ltd. (KR)

( * ) Notice: Subject to any disclaimer, the term of this patent is extended or adjusted under 35 U.S.C. 154(b) by 546 days.

(21) Appl. No.: 12/610,446

(22) Filed: Nov. 2, 2009

(65) Prior Publication Data

US 2010/0302353 A1 Dec. 2, 2010

(30) Foreign Application Priority Data

Jun. 1, 2009 (KR) .............................. 2009-0047968

(51) Int. Cl.
*H04N 13/04* (2006.01)
(52) U.S. Cl.
USPC .............................................. 348/58; 348/51
(58) Field of Classification Search
None
See application file for complete search history.

(56) References Cited

U.S. PATENT DOCUMENTS

| | | | |
|---|---|---|---|
| 6,252,570 B1* | 6/2001 | Mangerson | 345/87 |
| 2004/0120039 A1* | 6/2004 | Sato et al. | 359/465 |
| 2006/0050384 A1* | 3/2006 | Agostinelli | 359/462 |
| 2006/0238863 A1* | 10/2006 | Saishu | 359/472 |
| 2010/0321474 A1* | 12/2010 | Martinez et al. | 348/47 |

FOREIGN PATENT DOCUMENTS

| | | |
|---|---|---|
| KR | 1020030019995 A | 3/2003 |
| KR | 1020070117132 A | 12/2007 |
| KR | 1020080105389 A | 12/2008 |
| KR | 1020080106870 A | 12/2008 |

* cited by examiner

*Primary Examiner* — Mohamed Ibrahim
(74) *Attorney, Agent, or Firm* — Cantor Colburn LLP (57) ABSTRACT

A method for displaying a three-dimensional ("3D") image, wherein the method includes; sequentially displaying a left frame image corresponding to a left eye and a right frame image corresponding to a right eye on a display panel, blocking a light provided to a display block of the display panel when the display block displays a mixed image which includes a left eye image of the left frame image corresponding to the left eye and a right eye image of the right frame image corresponding to the right eye, and providing the light to the display block of the display panel when the display block displays only one of the left eye image and the right eye image.

13 Claims, 7 Drawing Sheets

METHOD FOR DISPLAYING A THREE-DIMENSIONAL IMAGE AND DISPLAY APPARATUS FOR PERFORMING THE METHOD

This application claims priority to Korean Patent Application No. 2009-47968, filed on Jun. 1, 2009, and all the benefits accruing therefrom under 35 U.S.C. §119, the content of which in its entirety is herein incorporated by reference.

BACKGROUND OF THE INVENTION

1. Field of the Invention

Exemplary embodiments of the present invention relate to a method for displaying a three-dimensional ("3D") image, and a display apparatus for performing the method. More particularly, exemplary embodiments of the present invention relate to a method for displaying a 3D image capable of improving display quality, and a display apparatus for performing the method.

2. Description of the Related Art

As demand for three-dimensional ("3D") images in computer games, movies, etc. has increased, the interest in 3D image display apparatuses displaying the 3D images has also increased.

A 3D image display apparatus displays a left image for a left eye and a right image for a right eye, the left image and the right image having binocular disparity, so that the left and right images are shown to the left eye and the right eye of an observer, respectively. The observer respectively sees the left image for the left eye and the right image for the right eye with the left eye and the right eye, respectively, and the observer's brain interprets the left image and the right image to perceive a 3D effect.

Typical 3D image display apparatuses may be classified as using either a glasses method or a non-glasses method in order to display a 3D image. The non-glasses method may include a parallax barrier method or a lenticular method. The non-glasses method may allow the 3D image to be seen without glasses, however observation positions may be detrimentally limited. Accordingly, the non-glasses method has a limitation in that a plurality of observers may not simultaneously be able to perceive a 3D effect of high quality.

Alternatively, the glasses method may typically include an anaglyph method using blue and red glasses for the left and the right eyes, respectively (or vice versa), or a liquid crystal shutter glasses method, in which a time-divisional screen is repeated at a certain interval and glasses having liquid crystal shutters synchronized with the interval are used. The 3D image display apparatus employing the liquid crystal shutter glasses method alternately displays the left image for the left eye and the right image for the right eye, and embodies the 3D image by opening and closing the liquid crystal shutters attached to the liquid crystal shutter glasses in accordance with a displayed image; thereby an image displayed by the display apparatus may be alternately viewed by the left eye and the right eye, depending on the activation of the liquid crystal shutter glasses.

When an image displayed on the display panel is converted from the left image for the left eye to the right image for the right eye or from the right image for the right eye to the left image for the left eye, the image is sequentially converted from top to bottom in a linear manner. When a mixed image including the left image and right image is displayed on the display panel, crosstalk is generated in an area in which the mixed image is displayed and the quality of the 3D display is deteriorated.

BRIEF SUMMARY OF THE INVENTION

Exemplary embodiments of the present invention provide a method for displaying a three-dimensional ("3D") image capable of improving display quality.

Exemplary embodiments of the present invention also provide a display apparatus for performing the method.

According to one exemplary embodiment of the present invention, a method for displaying a 3D image includes; sequentially displaying a left frame image corresponding to a left eye and a right frame image corresponding to a right eye on a display panel, blocking a light provided to a display block of the display panel when the display block displays a mixed image including a left eye image of the left frame image corresponding to the left eye and a right eye image of the right frame image corresponding the right eye, and providing the light to the display block of the display panel when the display block displays only one of the left eye image and the right eye image.

According to one exemplary embodiment of the present invention, a display apparatus includes; a display panel which includes a plurality of display blocks, wherein the plurality of display blocks sequentially display a left frame image corresponding to a left eye and a right frame image corresponding to a right eye, and a light source module which includes a plurality of light-emitting blocks, wherein the plurality of light-emitting blocks selectively emit a light provided to the plurality of display blocks and wherein at least one of the light-emitting blocks does not emit a light to a display block of the display panel when the display block displays a mixed image including a left eye image of the left frame image corresponding to the left eye and a right eye image of the right frame image corresponding to the right eye and which provides the light to the display block of the display panel when the display block displays only one of the left eye image and the right eye image.

According to the present invention, a light-emitting block is turned off corresponding to the display block displaying the mixed image including the left eye image and the right eye image, so that crosstalk caused by the mixed image may be prevented. Accordingly, the display quality of a 3D image may be improved.

BRIEF DESCRIPTION OF THE DRAWINGS

The above and other features and advantages of the present invention will become more apparent by describing in detailed example embodiments thereof with reference to the accompanying drawings, in which.

DETAILED DESCRIPTION OF THE INVENTION

The invention now will be described more fully hereinafter with reference to the accompanying drawings, in which exemplary embodiments of the present invention are shown. This invention may, however, be embodied in many different forms and should not be construed as limited to the exemplary embodiments set forth herein. Rather, these exemplary embodiments are provided so that this disclosure will be thorough and complete, and will fully convey the scope of the present invention to those skilled in the art. Like reference numerals refer to like elements throughout.

It will be understood that when an element or layer is referred to as being "on" another element, it can be directly on the other element or intervening elements may be present. In contrast, when an element is referred to as being "directly on" another element, there are no intervening elements present. As used herein, the term "and/or" includes any and all combinations of one or more of the associated listed items.

It will be understood that, although the terms first, second, third, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular example embodiments only and is not intended to be limiting of the present invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Exemplary embodiments of the invention are described herein with reference to cross-sectional illustrations that are schematic illustrations of idealized example embodiments (and intermediate structures) of the present invention. As such, variations from the shapes of the illustrations as a result, for example, of manufacturing techniques and/or tolerances, are to be expected. Thus, example embodiments of the present invention should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the present invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice of the invention as used herein.

Hereinafter, the present invention will be explained in detail with reference to the accompanying drawings.

Figure 1:
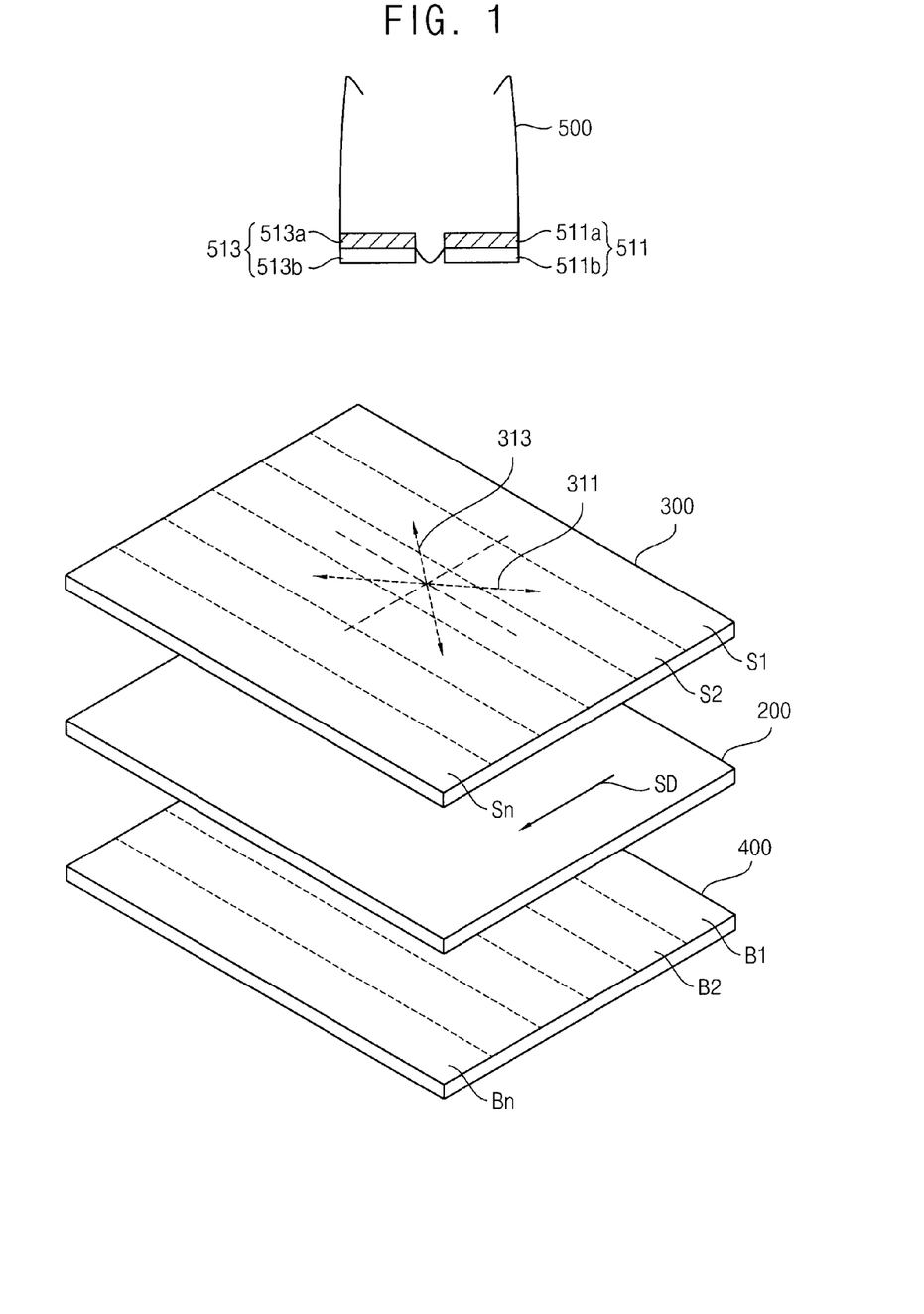
FIG. 1 is a schematic diagram illustrating an exemplary embodiment of a display apparatus according to the present invention.

FIG. 1 is a schematic diagram illustrating an exemplary embodiment of a display apparatus according to the present invention.

Referring to FIG. 1, the display apparatus includes a display panel module 200, a polarization panel module 300, a light source module 400 and polarization glasses 500.

The display panel module 200 sequentially displays a left eye image corresponding to a left eye and a right eye image corresponding to a right eye. For example, the display panel module 200 has a frame frequency of about 120 Hz, and sequentially displays a right frame image after displaying a left frame image in a repeating pattern. In one exemplary embodiment, the display panel module 200 may include a plurality of display blocks, or in an alternative exemplary embodiment the display panel module 200 includes a single display block.

The polarization panel module 300 includes a plurality of segments S1, . . . , Sn (wherein n is a natural number). The polarization panel module 300 is driven in one of a first polarization mode and a second polarization mode. The first polarization mode has a first polarization axis 311 and the second polarization mode has a second polarization axis 313. In one exemplary embodiment the first polarization axis and the second polarization axis are substantially perpendicular to one another. Each of the segments S1, . . . , Sn is sequentially driven along a scanning direction SD that corresponds to a displaying direction of an image on the display panel module 200, e.g., the scanning direction SD and a displaying direction of an image on the display panel module 200 are substantially parallel. For example, in one exemplary embodiment when the left frame image is displayed on the display panel module 200, the polarization panel module 300 is driven in the first polarization mode having the first polarization axis 311. According to such an exemplary embodiment, when the right frame image is displayed on the display panel module 200, the polarization panel module 300 is driven in the second polarization mode having the second polarization axis 313. In one exemplary embodiment, the second polarization axis 313 has a phase difference of about λ/2 with respect to the first polarization axis 311.

The light source module 400 includes a plurality of light-emitting blocks B1, ..., Bn (wherein n is a natural number). The light-emitting blocks B1, ..., Bn are arranged in the scanning direction SD that corresponds to a direction an image is displayed on the display panel module 200. The light-emitting blocks B1, ..., Bn are turned on or off according to an image displayed on the display panel module 200. For example, in one exemplary embodiment wherein a mixed image which includes the left eye image and the right eye image is displayed on a display block of the display panel module 200, the light-emitting block corresponding to the display block is turned off. When only the left eye image or the right eye image is displayed on the display block of the display panel module 200, the light-emitting block corresponding to the display block is turned on.

The polarization glasses 500 include a left lens part 511 and a right lens part 513. The left lens part 511 includes a first polarization film 511a having the first polarization axis 311 and a first shutter 511b. The right lens part 513 includes a second polarization film 513a having the second polarization axis 313 and a second shutter 513b. Although an exemplary embodiment wherein the polarization glasses 500 are shown with the polarization films 511a and 513a disposed closer to eyes of an observer than the shutters 511b and 513b is shown in FIG. 1, alternative exemplary embodiments include configurations wherein the proximity of the components to the eyes of the observer is reversed.

The polarization glasses 500 are driven based on the left frame image and the right frame image displayed on the display panel module 200. For example, in one exemplary embodiment, when the left frame image is displayed on the display panel module 200, the polarization panel module 300 is driven in the first polarization mode transmitting light having a light axis that is the same as the first polarization axis 311. In this case, the first shutter 511b of the polarization glasses 500 is opened and the second shutter 513b of the polarization glasses 500 is closed, so that the observer views the left eye image through the left lens part 511.

As described above, when the right frame image is displayed on the display panel module 200, the polarization panel module 300 is driven in the second polarization mode transmitting light having a light polarization axis that is substantially the same as the second polarization axis 313. In this case, the second shutter 513b of the polarization glasses 500 is opened and the first shutter 511b of the polarization glasses 500 is closed, so that the observer views the right eye image through the right lens part 513.

Figure 2:
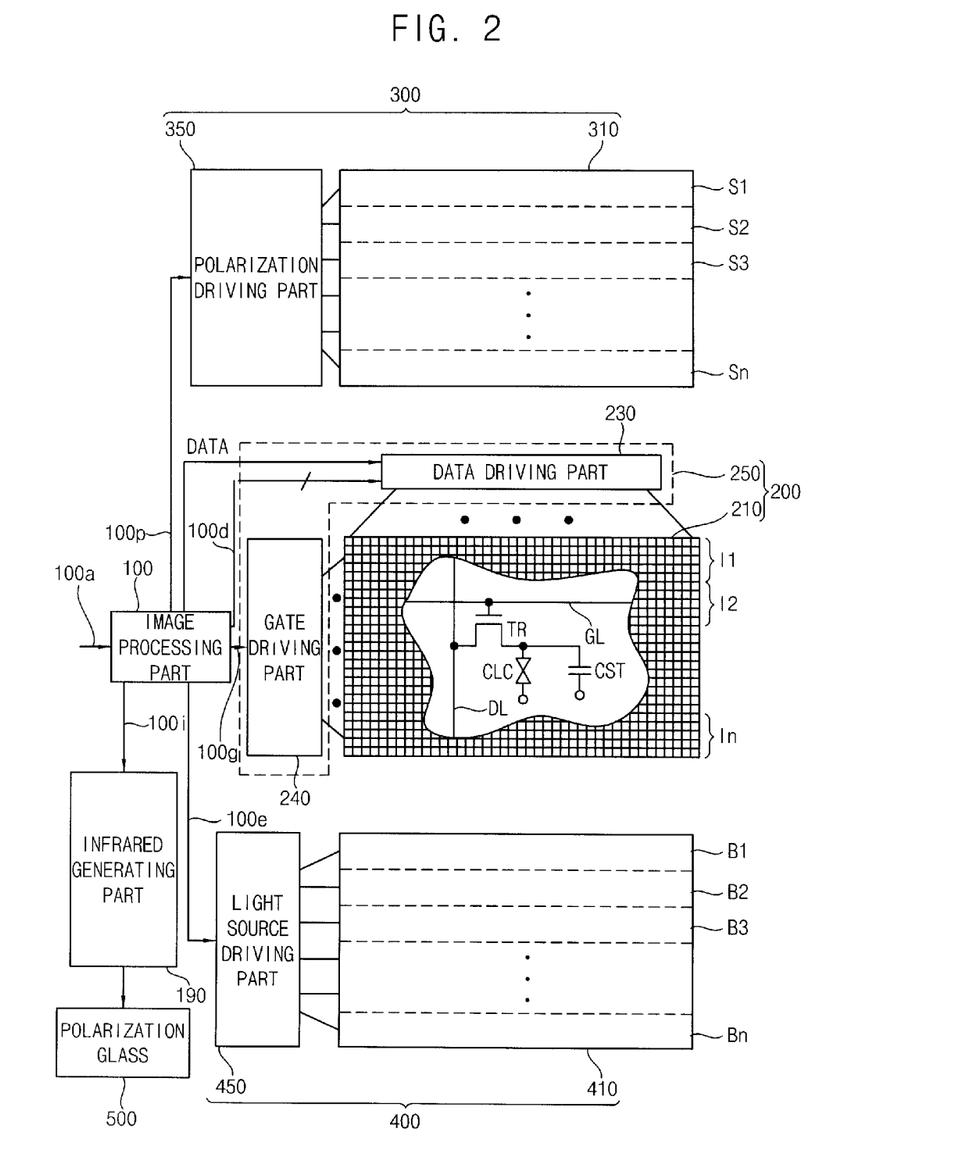
FIG. 2 is a block diagram illustrating an exemplary embodiment of the display apparatus of FIG. 1.
Figure 3:
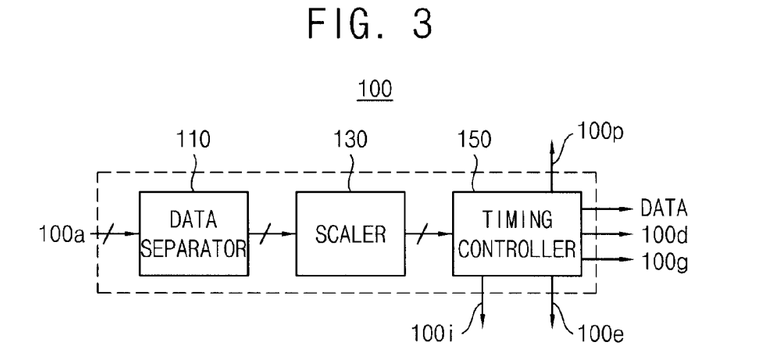
FIG. 3 is a block diagram illustrating an exemplary embodiment of the image processing part of FIG. 2.

FIG. 2 is a block diagram illustrating the exemplary embodiment of a display apparatus of FIG. 1. FIG. 3 is a block diagram illustrating an exemplary embodiment of an image processing part of FIG. 2.

Referring to FIGS. 1, 2 and 3, the display apparatus includes an image processing part 100, an infrared generating part 190, the display panel module 200, the polarization panel module 300 and the light source module 400.

In the present exemplary embodiment, the image processing part 100 includes a data separator 110, a scaler 130 and a timing controller 150. The data separator 110 receives a 3D frame image from an external source and separates the 3D frame image into the left frame image and the right frame image. For example, in one exemplary embodiment the data separator 110 has a frame frequency of about 60 Hz and receives the 3D frame image. The scaler 130 converts resolutions of the left eye image and the right eye image into a resolution of the display panel module 200. Alternative exemplary embodiments include configurations wherein the scaler 130 is omitted.

The timing controller 150 sequentially outputs the left frame image and the right frame image ("DATA") having the converted resolution at a frame frequency higher than that of the data separator 110. For example, in the exemplary embodiment wherein the scaler 130 outputs a signal having a frequency of about 60 Hz, the timing controller 150 sequentially outputs the left frame image and the right frame image having the converted resolution to the display panel module 200 at the frame frequency of about 120 Hz.

The timing controller 150 controls a driving timing of each of the infrared generating part 190, the display panel module 200, the polarization panel module 300 and the light source module 400. For example, in one exemplary embodiment the timing controller 150 provides the infrared generating part 190 with an infrared control signal 100i, the timing controller 150 provides the display panel module 200 with a data control signal 100d, the timing controller 150 provides a gate control signal 100g, the timing controller provides the polarization panel module 300 with a polarization control signal 100p, and the timing controller provides the light source module 400 with a light source control signal 100e.

The infrared generating part 190 generates an infrared signal in response to the infrared control signal 100i. Thus, the polarization glasses 500 receive the infrared signal and drive the first and second shutters 511b and 513b in response to the infrared signal.

The display panel module 200 includes a display panel 210 and a display driving part 250. The display panel 210 includes a plurality of pixels corresponding to the resolution of the display, e.g., if the display has a resolution of 1920×1080 the display includes at least about 2,073,600 pixels, and displays the frame image. The plurality of pixels may be divided into a plurality of display blocks I1, I2, ..., In. In one exemplary embodiment, the display blocks are formed as rows extending substantially parallel to the gate line GL, although alternative exemplary embodiments include other configurations for the display blocks. In one exemplary embodiment, each of the plurality of pixels includes a switching element TR connected to a data line DL and a gate line GL disposed substantially perpendicular to the data line DL, a liquid crystal capacitor CLC and a storage capacitor CST. Alternative exemplary embodiments include configurations wherein the storage capacitor CST may be omitted.

The display driving part 250 includes a data driving part 230 and a gate driving part 240. The data driving part 230 outputs the frame image to the data lines of the display panel 210 by applying a plurality of data signals to a plurality of data lines DL based on the data control signal 100d. Exemplary embodiments of the data control signal 100d may include a dot clock signal, a data enable signal, a horizontal synchronization signal, a vertical synchronization signal, an inversion signal, and other similar signals.

The gate driving part 240 sequentially outputs the gate signals to the gate lines GL of the display panel 210 based on the gate control signal 100g. Therefore, the plurality of data signals are sequentially applied to a row of pixels connected to a gate line GL which receives an "on" gate signal. Exemplary embodiments of the gate control signal 100g may include a first clock signal, a second clock signal, a vertical state signal, and other similar signals.

The polarization panel module 300 includes a polarization panel 310 and a polarization driving part 350. The polarization panel 310 includes a plurality of segments S1, ..., Sn. As shown in FIG. 2, in one exemplary embodiment the plurality of segments S1, ..., Sn may be horizontal segments extending across substantially the entire polarization panel 310, thereby dividing the polarization panel 310 into a plurality of rows, although alternative exemplary embodiments may have other configurations.

The polarization driving part 350 individually drives the segments S1, ..., Sn with the first polarization mode or the second polarization mode based on the polarization control signal 100p. Each of the segments S1, ..., Sn corresponds to k (wherein k is a natural number) gate lines. A first segment S1 corresponds to first to (k)-th gate lines, a second segment S2 corresponds to (k+1)-th to (2k)-th gate lines, and so forth until an (n)-th segment Sn corresponds to ((n−1)k+1)-th to (nk)-th gate lines. For example, in one exemplary embodiment, when first to (k)-th gate signals are applied to the first to (k)-th gate lines corresponding to the first segment S1 and the left eye image is displayed on a first display block I1 corresponding to the first segment S1, the polarization driving part 350 drives the first segment S1 with the first polarization mode. Additionally in such an exemplary embodiment, when the first to (k)-th gate signals are applied to the first to (k)-th gate lines and the right eye image is displayed on the first display block I1, the polarization driving part 350 drives the first segment S1 with the second polarization mode.

The light source module 400 includes a light source unit 410 and a light source driving part 450. The light source unit 410 includes a plurality of light-emitting blocks B1, ..., Bn. In one exemplary embodiment each of the plurality of light-emitting blocks B1, ..., Bn extends horizontally across the light source module 400, although alternative exemplary embodiments include configurations wherein the light-emitting blocks B1, ..., Bn have other arrangements. In one exemplary embodiment, the number of the light-emitting blocks B1, ..., Bn may be substantially the same number as that of the segments S1, ..., Sn. In the present exemplary embodiment, the first light-emitting block B1 corresponds to a first display block I1, a second light-emitting block B2 corresponds to a second display block I2, and so forth until an (n)-th light-emitting block Bn corresponds to an (n)-th display block In.

The light source driving part 450 individually drives the light-emitting blocks B1, ..., Bn based on the light source control signal 100e. The light source driving part 450 turns on or off each of the light-emitting blocks B1, ..., Bn according to an image displayed on each of the display blocks I1, ..., In. For example, in one exemplary embodiment, when one of the left eye image and the right eye image is displayed on the first display block I1, the light source driving part 450 turns on the first light-emitting block B1. Additionally, when the mixed image including the left eye image and the right eye image is displayed on the first display block I1, the light source driving part 450 turns off the first light-emitting block B1.

Figure 4A:
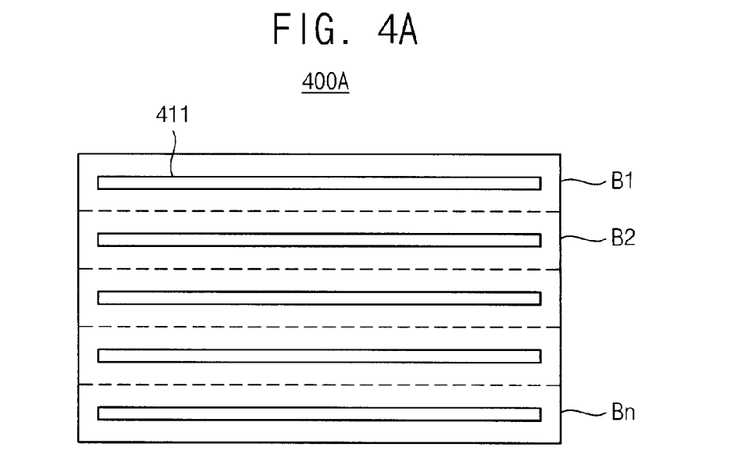
FIGS. 4A to 4C are schematic diagrams illustrating exemplary embodiments of various light source modules of FIG. 1.
Figure 4B:
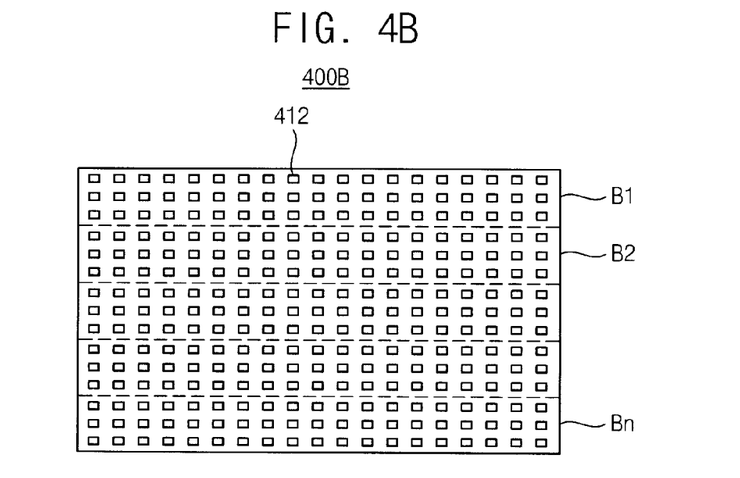
Figure 4C:
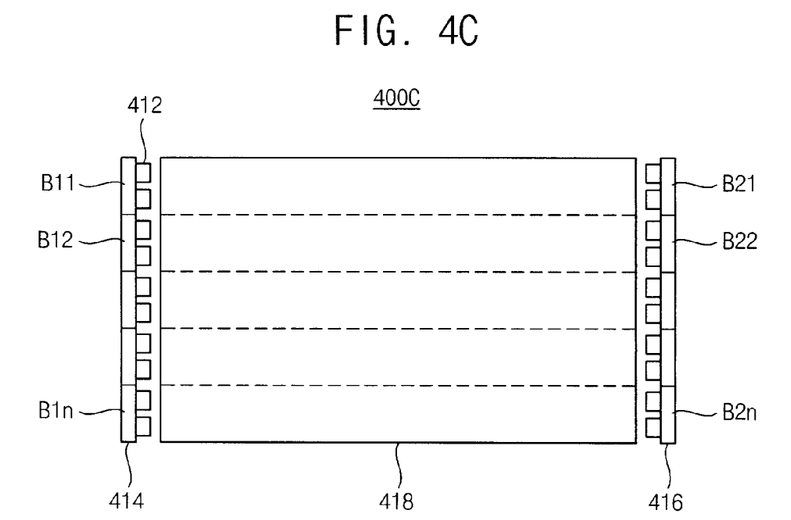

FIGS. 4A to 4C are schematic diagrams illustrating various exemplary embodiments of light source modules 400 of FIG. 1.

Referring to FIGS. 2 and 4A, the light source module 400A includes a plurality of light-emitting blocks B1, ..., Bn. In the exemplary embodiment of a light source module 400A of FIG. 4A, each of the light-emitting blocks B1, ..., Bn includes at least one lamp 411.

Referring to FIGS. 2 and 4B, the light source module 400B includes a plurality of light-emitting blocks B1, ..., Bn. In the exemplary embodiment of a light source module 400A of FIG. 4B, each of the light-emitting blocks B1, ..., Bn includes a plurality of light-emitting diodes ("LEDs") 412.

Referring to FIGS. 2 and 4C, the light source module 400 includes a light guide plate ("LGP") 418 and at least one edge light-emitting unit. The at least one edge light-emitting unit is disposed adjacent to an edge of the LGP 418. For example, in one exemplary embodiment, a first edge light-emitting unit 414 is disposed adjacent to a first edge of the LGP 418, and includes a plurality of first light-emitting blocks B11, ..., B1n. A second edge light-emitting unit 416 is disposed adjacent to a second edge opposite to the first edge of the LGP 418 and includes a plurality of second light-emitting blocks B21, ..., B2n. In such an exemplary embodiment, the first light-emitting blocks B11, ..., B1n are individually driven by the light source driving part 450, and the second light-emitting blocks B21, ..., B2n are synchronized with a driving timing of the first light-emitting blocks B11, ..., B1n. In one exemplary embodiment, each of the light-emitting blocks B11, ..., B1n, B21, ..., B2n includes at least one LED 412. Alternative exemplary embodiments of the light source module 400C may comprise one edge light-emitting unit, three edge light-emitting units or four edge light-emitting units.

FIGS. 5A to 5F are schematic diagrams illustrating an exemplary embodiment of a method for displaying a 3D image using the display apparatus of FIG. 1. Hereinafter, an exemplary embodiment of the display apparatus having four light-emitting blocks and four segments will be described for clarity of description, although alternative exemplary embodiments may include a greater or lesser number of light-emitting blocks and segments.

Figure 5A:
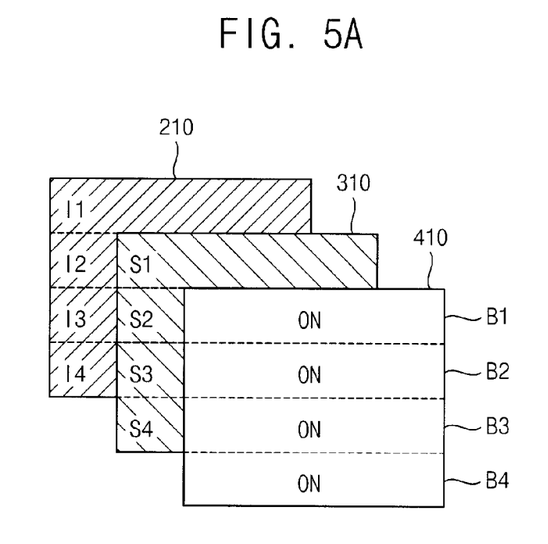
FIGS. 5A to 5F are schematic diagrams illustrating an exemplary embodiment of a method for displaying a three-dimensional ("3D") image using the exemplary embodiment of a display apparatus of FIG. 1.

Referring to FIGS. 2 and 5A, when the right eye image is displayed on an entire area of the display panel 210, e.g., on all display blocks I1 through I4, first, second, third and fourth segments S1, S2, S3 and S4 of the polarization panel 310 are driven in the second polarization mode corresponding to the right eye image. For example, in one exemplary embodiment, when the polarization panel 310 is turned off, the polarization panel 310 is driven in the second polarization mode.

At such a time, the first, second, third and fourth light-emitting blocks B1, B2, B3 and B4 of the light source unit 410 are all turned on. When the right eye image is displayed on the first, second, third and fourth display blocks I1, I2, I3 and I4, the first, second, third and fourth light-emitting blocks B1, B2, B3 and B4 respectively corresponding to the first, second, third and fourth display blocks I1, I2, I3 and I4, are turned on.

Figure 5B:
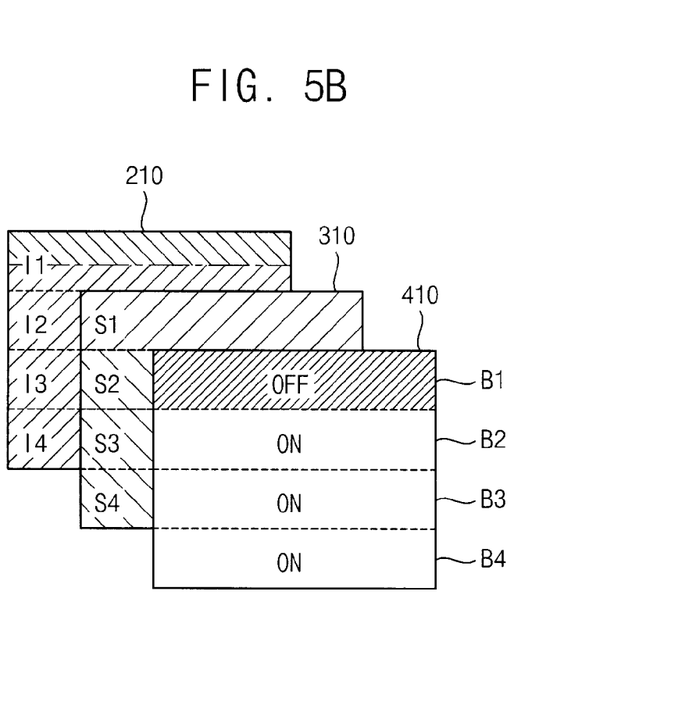

Referring to FIGS. 2 and 5B, when the right eye image displayed on the display panel 210 is converted into the left eye image, the mixed image including the right eye image corresponding to a previous frame and the left eye image corresponding to a present frame is displayed on the first display block I1, and the right eye image corresponding to the previous frame is displayed on the second, third and fourth display blocks I2, I3 and I4. This is due to the scanning of the gate lines GL and the data lines DL on the display panel module 200 where the gate lines GL are sequentially scanned in the direction of the first display block I1 to the last display block I4; essentially new frame images are overwritten over a previous frame image starting from top to bottom and therefore image information corresponding to both a current and previous frame may be simultaneously displayed on the display panel module 200 during a scanning period.

The first segment S1 of the polarization panel 310 is driven in the first polarization mode corresponding to the left eye image of the present frame, and the second, third and fourth segments S2, S3 and S4 are driven in the second polarization mode corresponding to the right eye image of the previous frame. The first segment S1 driven in the first polarization mode polarizes the mixed image including the right eye image and the left eye image. For example, in one exemplary embodiment when the polarization panel 310 is turned on, the polarization panel 310 is driven in the first polarization mode, and when the polarization panel 310 is turned off, the polarization panel 310 is driven in the second polarization mode, as described briefly above.

In such an exemplary embodiment, the first light-emitting block B1 of the light source unit 410 is turned off. That is, the light source driving part 450 turns off (OFF) the first light-emitting block B1 corresponding to the first display block I1 displaying the mixed image including the left eye image and the right eye image. The light source driving part 450 turns on (ON) the second, third and fourth light-emitting blocks B2, B3 and B4. Therefore, light is not transmitted through the first segment S1 so that the observer may not be able to view the mixed image displayed on the first display block I1. Thereby, crosstalk caused by the mixed image including the left eye image and the right eye image may be prevented and display quality may be improved.

Figure 5C:
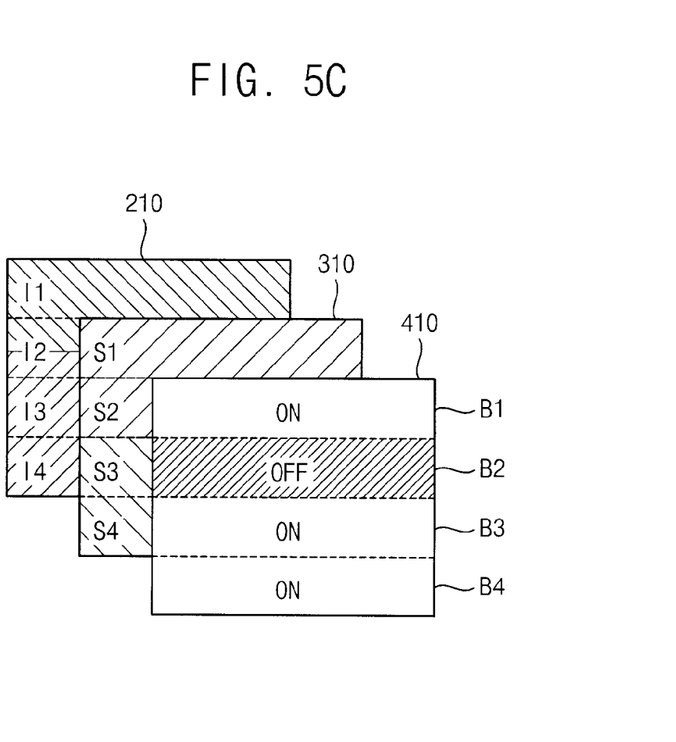

Referring to FIGS. 2 and 5C, the left eye image of the present frame is displayed on the first display block I1, the mixed image including the left eye image of the present frame and the right eye image of the previous frame is displayed on the second display block I2. Additionally, the right eye image of the previous frame is displayed on the third and fourth display blocks I3 and I4.

The first and second segments S1 and S2 of the polarization panel 310 are driven in the first polarization mode corresponding to the left eye image, and the third and fourth segments S3 and S4 are driven in the second polarization mode corresponding to the right eye image. The second segment S2 driven in the first polarization mode polarizes the mixed image including the right eye image and the left eye image.

At this time, the second light-emitting block B2 of the light source unit 410 is turned off. That is, the light source driving part 450 turns off (OFF) the second light-emitting block B2 corresponding to the second display block I2 displaying the mixed image including the left eye image and the right eye image; the turning off of the light-emitting block may also be referred to as blocking light from the light-emitting block. The light source driving part 450 turns on (ON) the first, third and fourth light-emitting blocks B1, B3 and B4. Therefore, light is not transmitted through the second segment S2 so that the so that the observer may not be able to view the mixed image of the second display block I2. Thereby, crosstalk caused by the mixed image including the left eye image and the right eye image may be prevented and display quality may be improved.

Figure 5D:
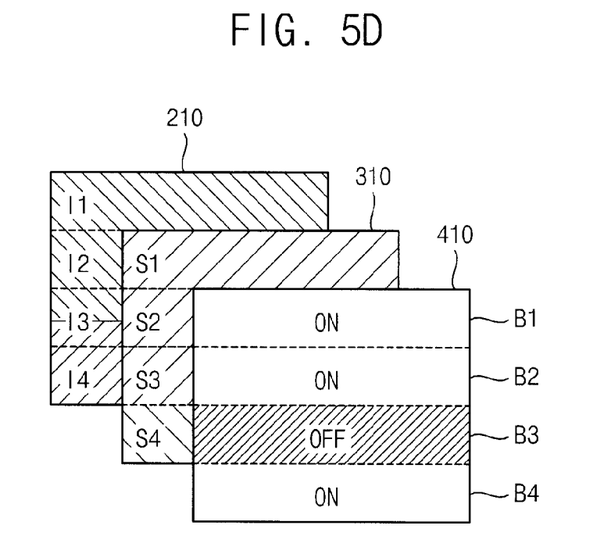

Referring to FIGS. 2 and 5D, the left eye image of the present frame is displayed on the first and second display blocks I1 and I2, the mixed image including the left eye image of the present frame and the right eye image of the previous frame is displayed on the third display block I3. Additionally, the right eye image of the previous frame is displayed on the fourth display block I4.

The first, second and third segments S1, S2 and S3 of the polarization panel 310 are driven in the first polarization mode corresponding to the left eye image, and the fourth segment S4 are driven in the second polarization mode corresponding to the right eye image. The third segment S3 driven in the first polarization mode polarizes the mixed image including the right eye image and the left eye image.

At this time, the third light-emitting block B3 of the light source unit 410 is turned off. That is, the light source driving part 450 turns off (OFF) the third light-emitting block B3 corresponding to the third display block I3 displaying the mixed image including the left eye image and the right eye image. The light source driving part 450 turns on (ON) the first, second and fourth light-emitting blocks B1, B2 and B4. Therefore, light is not transmitted through the third segment S3 so that the so that the observer may not be able to view the mixed image. Thereby, crosstalk caused by the mixed image including the left eye image and the right eye image may be prevented and display quality may be improved.

Figure 5E:
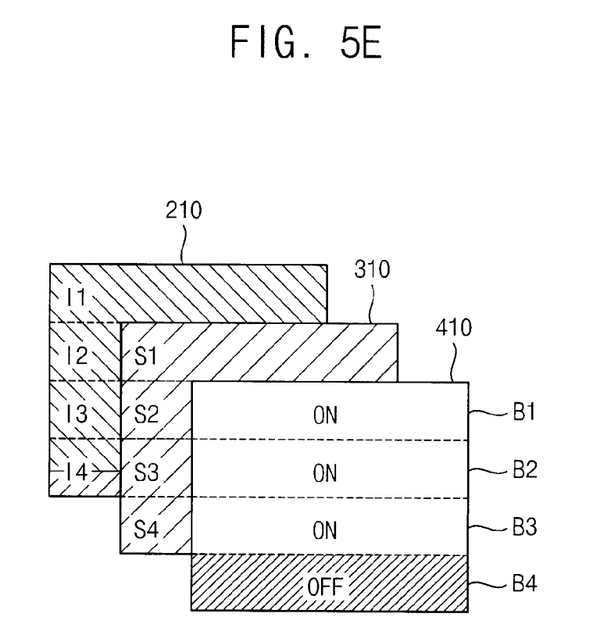

Referring to FIGS. 2 and 5E, the left eye image of the present frame is displayed on the first, second and third display blocks I1, I2 and I3, the mixed image including the left eye image of the present frame and the right eye image of the previous frame is displayed on the fourth display block I4.

The first, second, third and fourth segments S1, S2, S3 and S4 of the polarization panel 310 are driven in the first polarization mode corresponding to the left eye image. The fourth segment S4 driven in the first polarization mode polarizes the mixed image including the right eye image and the left eye image.

At this time, the fourth light-emitting block B4 of the light source unit 410 is turned off. That is, the light source driving part 450 turns off (OFF) the fourth light-emitting block B4 corresponding to the fourth display block I4 displaying the mixed image including the left eye image and the right eye image. The light source driving part 450 turns on (ON) the first, second and third light-emitting blocks B1, B2 and B3. Therefore, light is not transmitted through the fourth segment S4 so that the so that the observer may not be able to view the mixed image. Thereby, crosstalk caused by the mixed image including the left eye image and the right eye image may be prevented and display quality may be improved.

Figure 5F:
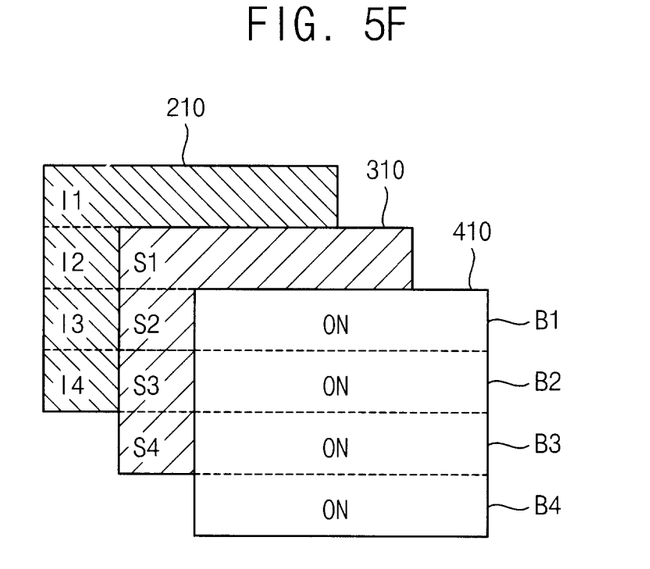

Referring to FIGS. 2 and 5F, when the left eye image is displayed on an entire area of the display panel 210, the first, second, third and fourth segments S1, S2, S3 and S4 of the polarization panel 310 are driven in the first polarization mode corresponding to the left eye image.

At this time, the light source driving part 450 turns on the first, second, third and fourth light-emitting blocks B1, B2, B3 and B4 of the light source unit 410. When only the left eye image is displayed on the first, second, third and fourth display blocks I1, I2, I3 and I4, the first, second, third and fourth light-emitting blocks B1, B2, B3 and B4 respectively corresponding to the first, second, third and fourth display blocks I1, I2, I3 and I4, are all turned on.

As described above, according to exemplary embodiments of the present invention, a light-emitting block is turned off corresponding to a display block displaying a mixed image including a left eye image and a right eye image, so that crosstalk caused by the mixed image may be prevented. Accordingly, the display quality of a 3D image may be improved.

The foregoing is illustrative of the present invention and is not to be construed as limiting thereof. Although a few exemplary embodiments of the present invention have been described, those skilled in the art will readily appreciate that many modifications are possible in the exemplary embodiments without materially departing from the novel teachings and advantages of the present invention. Accordingly, all such modifications are intended to be included within the scope of the present invention as defined in the claims. In the claims, means-plus-function clauses are intended to cover the structures described herein as performing the recited function and not only structural equivalents but also equivalent structures. Therefore, it is to be understood that the foregoing is illustrative of the present invention and is not to be construed as limited to the specific exemplary embodiments disclosed, and that modifications to the disclosed exemplary embodiments, as well as other exemplary embodiments, are intended to be included within the scope of the appended claims. The present invention is defined by the following claims, with equivalents of the claims to be included therein.

What is claimed is:

1. A method for displaying a three-dimensional image, the method comprising:
sequentially displaying a left frame image corresponding to a left eye and a right frame image corresponding to a right eye on a display panel;
turning off a light emitting block of a light source module corresponding to a display block of the display panel when the display block displays a mixed image which includes a left eye image of the left frame image corresponding to the left eye and a right eye image of the right frame image corresponding to the right eye, the light source module including a plurality of light emitting blocks generating the light, the display panel including a plurality of display blocks; and
turning on the light emitting block corresponding to the display block of the display panel when the display block displays one of the left eye image and the right eye image.

2. The method of claim 1, further comprising:
driving a segment of a polarization panel disposed on the display panel with one of a first polarization mode having a first polarization axis and a second polarization mode having a second polarization axis according to an image displayed on the display block.

3. The method of claim 2, wherein when the display block displays the left eye image the segment of the polarization panel is driven in the first polarization mode, and
when the display block displays the right eye image the segment of the polarization panel is driven in the second polarization mode,
wherein the first polarization axis is substantially different than the second polarization axis.

4. The method of claim 3, wherein when the display block displays the mixed image, the segment of the polarization panel is driven in one of the first polarization mode and the second polarization mode.

5. A display apparatus comprising:
a display panel which includes a plurality of display blocks, wherein the plurality of display blocks sequentially display a left frame image corresponding to a left eye and a right frame image corresponding to a right eye; and
a light source module which includes a plurality of light-emitting blocks generating a light, wherein the plurality of light-emitting blocks selectively emit the light provided to the plurality of display blocks and wherein at least one of the light-emitting blocks does not emit a light to a display block of the display panel when the display block displays a mixed image including a left eye image of the left frame image corresponding to the left eye and a right eye image of the right frame image corresponding to the right eye, and which provides the light to the display block of the display panel when the display block displays only one of the left eye image and the right eye image.

6. The display apparatus of claim 5, further comprising:
a polarization panel including a plurality of segments corresponding to the plurality of display blocks, wherein each of the segments is driven with one of a first polarization mode and a second polarization mode according to an image displayed on the respective display block.

7. The display apparatus of claim 6, wherein when the display block displays the mixed image, the segment is driven in one of the first polarization mode and the second polarization mode.

8. The display apparatus of claim 6, wherein a number of the light-emitting blocks is substantially the same as a number of the segments.

9. The display apparatus of claim 6, wherein the plurality of light-emitting blocks are sequentially arranged in a scanning direction of an image on the display panel, and
wherein the plurality of segments are sequentially arranged in the scanning direction of an image on the display panel.

10. The display apparatus of claim 6, wherein the first polarization mode has a first polarization axis and the second polarization mode has a second polarization axis having a phase difference about $\lambda/2$ with respect to the first polarization axis.

11. The display apparatus of claim 5, wherein each of the plurality of light-emitting blocks includes at least one lamp.

12. The display apparatus of claim 5, wherein each of the plurality of light-emitting blocks includes at least one light-emitting diode.

13. A method for displaying a three-dimensional image, the method comprising:
sequentially displaying a left frame image corresponding to a left eye and a right frame image corresponding to a right eye on a display panel;
generating a first light to provide a plurality of display blocks of the display panel with the first light when the plurality of display blocks each display only one of the left frame image and the right frame image;
generating a second light to provide a display block of the display panel with the second light when the display block displays a mixed image which includes a left eye image of the left frame image corresponding to the left eye and a right eye image of the right frame image corresponding to the right eye; and
providing the light to the display block of the display panel when the display block displays only one of the left eye image and the right eye image,
wherein the first light corresponds to an on-state of a light source module and the second light corresponds to an off-state of the light source module.

* * * * *